US012663592B2

(12) United States Patent
Ooi et al.

(10) Patent No.: US 12,663,592 B2
(45) Date of Patent: Jun. 23, 2026

(54) FUSED FIBER-OPTIC TAPERS IN OPTICAL WIRELESS RECEIVERS AND METHOD

(71) Applicant: KING ABDULLAH UNIVERSITY OF SCIENCE AND TECHNOLOGY, Thuwal (SA)

(72) Inventors: Boon S. Ooi, Thuwal (SA); Omar Alkhazragi, Thuwal (SA); Abderrahmen Trichili, Thuwal (SA); Islam Ashry, Thuwal (SA); Tien Khee Ng, Thuwal (SA); Mohamed-Slim Alouini, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 160 days.

(21) Appl. No.: 18/022,773

(22) PCT Filed: Sep. 10, 2021

(86) PCT No.: PCT/IB2021/058255
§ 371 (c)(1),
(2) Date: Feb. 23, 2023

(87) PCT Pub. No.: WO2022/058854
PCT Pub. Date: Mar. 24, 2022

(65) Prior Publication Data
US 2023/0314731 A1      Oct. 5, 2023

Related U.S. Application Data

(60) Provisional application No. 63/081,022, filed on Sep. 21, 2020.

(51) Int. Cl.
*G02B 6/42*      (2006.01)
*H04B 10/11*      (2013.01)

(52) U.S. Cl.
CPC ........... *G02B 6/4203* (2013.01); *H04B 10/11* (2013.01)

(58) Field of Classification Search
CPC .......... G02B 6/4203; G02B 6/04; G02B 6/06; G02B 6/421; G02B 6/4204; H04B 10/11; H04B 10/25; H04B 10/66
See application file for complete search history.

(56) References Cited

U.S. PATENT DOCUMENTS

| 5,288,992 A * | 2/1994 | Fohl ................... G02B 6/29361 |
| | | 250/227.28 |
| 5,311,611 A * | 5/1994 | Migliaccio ............. G02B 13/00 |
| | | 385/33 |

(Continued)

OTHER PUBLICATIONS

Toshiyuki Horiuchi, "Improved projection-matrix-exposure using a liquid crystal display panel for printing smooth arbitrary patterns without reticles", Mar. 2004, Science direct, All pages (Year: 2004).*

(Continued)

*Primary Examiner* — Pranesh K Barua
(74) *Attorney, Agent, or Firm* — PATENT PORTFOLIO BUILDERS PLLC

(57)      ABSTRACT

A compounded light-focusing optical element is configured to focus light, and the compounded light-focusing optical element includes a body having a first, flat, end face and a second, curved end face, the second, curved end face being opposite to the first, flat end face, and plural optical fibers extending through the body, from the first, flat end face to the second, curved end face. The plural optical fibers are fused to each other to form the body, and end faces of the plural optical fibers, corresponding to the second, curved end face, are pointing in different directions.

18 Claims, 14 Drawing Sheets

(56) References Cited

U.S. PATENT DOCUMENTS

| | | | | |
|---|---|---|---|---|
| 5,615,294 A * | 3/1997 | Castonguay | ............. | G02B 6/04 |
| | | | | 385/115 |
| 8,294,879 B2 | 10/2012 | Silny et al. | | |
| 9,564,968 B2 * | 2/2017 | Chen | ................. | H04B 10/1121 |
| 9,749,044 B1 | 8/2017 | Tiecke et al. | | |
| 9,804,251 B1 * | 10/2017 | Reardon | ................. | G02B 6/32 |
| 2007/0237490 A1 * | 10/2007 | Reininger | ................ | G02B 6/06 |
| | | | | 385/147 |
| 2018/0094786 A1 * | 4/2018 | Nguyen | ................... | G02B 6/04 |
| 2020/0177278 A1 * | 6/2020 | O'Brien | ............. | H10H 20/8512 |

OTHER PUBLICATIONS

Horiuchi, T., et al., "Improved Projection-Matrix-Exposure using a Liquid Crystal Display Panel for Printing Smooth Arbitrary Patterns without Reticles," Microelectronic Engineering, Jun. 1, 2004 (available online Mar. 9, 2004), vol. 73-74, pp. 48-52, Elsevier Publishers B.V.
International Search Report in corresponding/related International Application No. PCT/IB2021/058255, date of mailing Dec. 6, 2021.
Written Opinion of the International Searching Authority in corresponding/related International Application No. PCT/IB2021/058255, date of mailing Dec. 6, 2021.

* cited by examiner

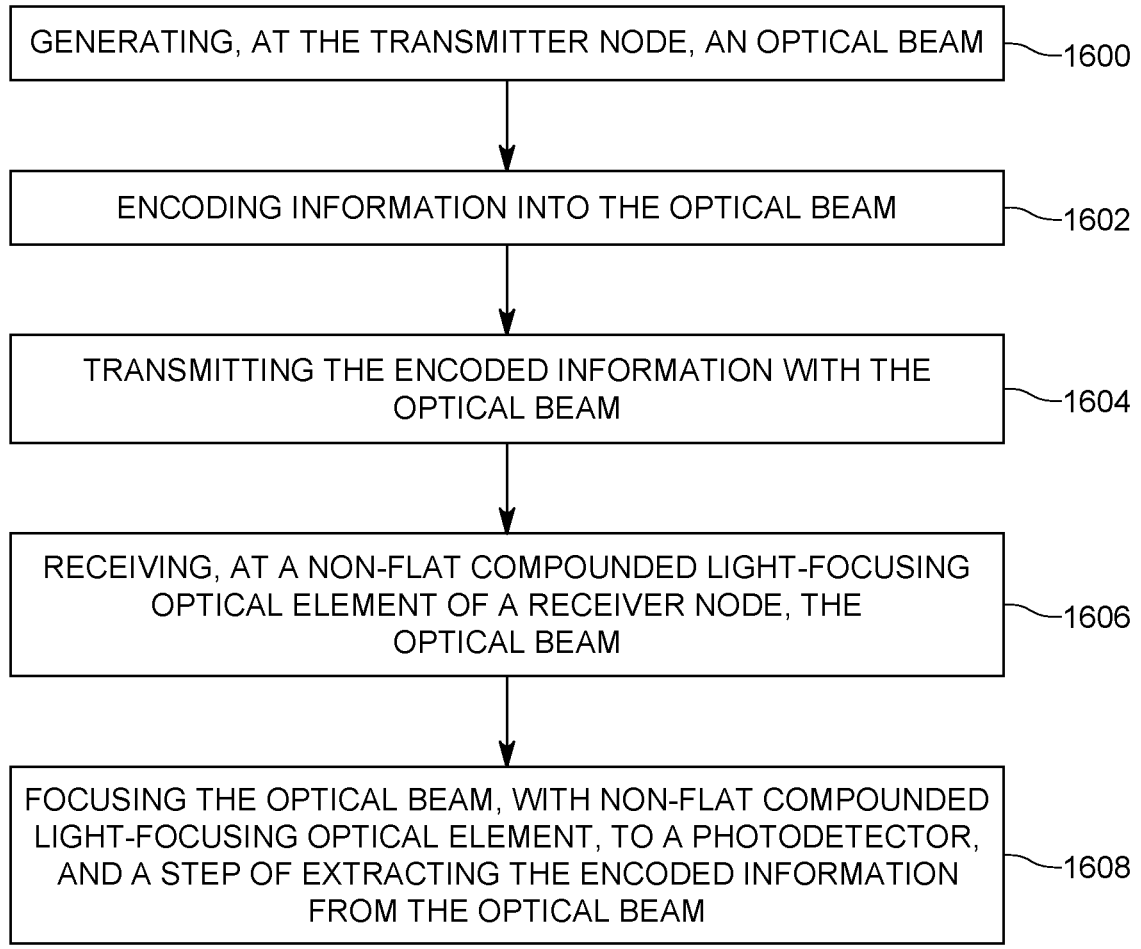

GENERATING, AT THE TRANSMITTER NODE, AN OPTICAL BEAM ——1600

ENCODING INFORMATION INTO THE OPTICAL BEAM ——1602

TRANSMITTING THE ENCODED INFORMATION WITH THE OPTICAL BEAM ——1604

RECEIVING, AT A NON-FLAT COMPOUNDED LIGHT-FOCUSING OPTICAL ELEMENT OF A RECEIVER NODE, THE OPTICAL BEAM ——1606

FOCUSING THE OPTICAL BEAM, WITH NON-FLAT COMPOUNDED LIGHT-FOCUSING OPTICAL ELEMENT, TO A PHOTODETECTOR, AND A STEP OF EXTRACTING THE ENCODED INFORMATION FROM THE OPTICAL BEAM ——1608

FIG. 16

FUSED FIBER-OPTIC TAPERS IN OPTICAL WIRELESS RECEIVERS AND METHOD

CROSS-REFERENCE TO RELATED APPLICATIONS

This application is a U.S. National Stage Application of International Application No. PCT/IB2021/058255, filed on Sep. 10, 2021, which claims priority to U.S. Provisional Patent Application No. 63/081,022, filed on Sep. 21, 2020, entitled "FUSED FIBER-OPTIC TAPERS IN OPTICAL WIRELESS RECEIVERS," the disclosures of which are incorporated herein by reference in its-their entirety.

BACKGROUND

Technical Field

Embodiments of the subject matter disclosed herein generally relate to a system and method for optical wireless communication, and more particularly, to a compounded optical focusing element used with a photodetector to provide high optical gain and a wide field of view while maintaining a high-speed response.

Discussion of the Background

Using infrared (IR), visible, and ultraviolet (UV) light in optical wireless communication (OWC) has recently attracted significant attention owing to the advances in semiconductor light sources, including laser diodes (LDs), superluminescent diodes (SLDs), and light-emitting diodes (LEDs). OWC offers a wide, untapped bandwidth in the electromagnetic spectrum that can meet the increasing demand for high-speed communication in fifth generation (5G) networks and beyond. However, one of the main challenges in establishing reliable OWC connections is fulfilling the strict pointing, acquisition, and tracking (PAT) requirements between two communicating terminals or nodes. In this regard, if one or both terminals that use the OWC is moving, the alignment between the two nodes required for an efficient OWC link is very taxing on the system and difficult to achieve.

This difficulty in maintaining the alignment between the two terminals (e.g., transmitter and receiver) is mainly due to the small active area of the photodetector (PD) and the narrow field of view (FOV) of the receiver. The PD's junction capacitance increases as its active area increases, which makes the resistor-capacitor (RC) time constant longer, which limits the modulation bandwidth of the link. A lens is then necessary in most high-speed applications in order to focus more light on the small-area PD to improve the signal-to-noise ratio (SNR). However, the addition of the lens limits the FOV of the receiver following the conservation of etendue. Therefore, there is a need for a high-gain, wide-FOV optical receiver with a fast response. This is especially critical for detectors mounted on mobile receiver nodes, such as drones, remotely operated vehicles, and satellites.

An OWC system includes, as shown in FIG. 1, a transmitter 110, a receiver 120, and a transmission channel 130 in which light 132 propagates. The transmitter 110 may include electronic components 112, optical components 114 and at least one light source 116, whose intensity is modulated directly, by the electronic components 112, by varying the injected current or by an external modulator. The receiver 120 may include receiving optics 122, electronic components 124, and at least one light-sensitive element 126, which records the variations in the light intensity of the incoming light 132. The signal carried by the incoming light 132 is then decoded from the intensity variations. The light-sensitive element 126 may be a PD or an avalanche PD (APD), among other possible light-sensitive elements. The transmission channel 130 over which the signal is propagating may be free space, air, water, and/or any suitable medium in which light can travel.

The wavelength of the light beam carrying the signal may vary depending on the application and the transmission channel. In free space, for example, wavelengths in the near-infrared (NIR) band of the electromagnetic (EM) spectrum are used in free-space optical (FSO) links due to the low extinction coefficient of air in this band, which improves the efficiency of the link. However, in underwater environments, the NIR band experiences high attenuation. The blue-green band of the EM spectrum experiences the lowest attenuation in water, so they are commonly used in underwater OWC. Moreover, light sources emitting light at different wavelengths may be used simultaneously to improve the performance of the OWC link by implementing wavelength-division multiplexing (WDM) and/or wavelength diversity. Therefore, designing the optical detector 126 to operate over a wide wavelength band makes it a versatile apparatus that is useful in a variety of applications.

Photodetectors used in detecting communication signals carried by light in the optical band are designed to have a small active area to maintain a high-speed response. Due to the small amount of optical power that can be detected by the small area, the optical element 122 is used to focus more light onto it. However, due to the conservation of etendue, the FOV of such an element is inversely proportional to the amount of optical gain it provides.

Thus, there is a need for a new system and method that is capable of concentrating the incoming light to the small size light-sensitive element 126 without reducing the FOV and while maintaining a high optical gain. The new system needs to show a high transmission efficiency for wavelengths in the visible and NIR band, as well as a fast response.

BRIEF SUMMARY OF THE INVENTION

According to an embodiment, there is a compounded light-focusing optical element configured to focus light, and the compounded light-focusing optical element includes a body having a first, flat, end face and a second, curved end face, the second, curved end face being opposite to the first, flat end face, and plural optical fibers extending through the body, from the first, flat end face to the second, curved end face. The plural optical fibers are fused to each other to form the body and end faces of the plural optical fibers, corresponding to the second, curved end face, are pointing in different directions.

According to another embodiment, there is an optical wireless communication system that includes a transmitter node configured to generate an optical beam having encoded information, and a receiver node configured to receive the optical beam and to extract the encoded information. The receiver node includes a non-flat compounded light-focusing optical element configured to focus the optical beam, the non-flat compounded light-focusing optical element including, a body having a first, flat, end face and a second, curved end face, the second, curved end face being opposite to the first, flat end face, and plural optical fibers extending through the body, from the first, flat end face to the second, curved end face. The plural optical fibers are fused to each other to form the body and end faces of the plural optical fibers, corresponding to the second, curved end face, are pointing in different directions.

According to yet another embodiment, there is a method for optical wireless communication. The method includes generating, at a transmitter node, an optical beam, encoding information into the optical beam, transmitting in a wireless manner the encoded information with the optical beam, receiving, at a non-flat compounded light-focusing optical element of a receiver node, the optical beam, focusing the optical beam, with the non-flat compounded light-focusing optical element, to a photodetector, and extracting the encoded information from the optical beam. The non-flat compounded light-focusing optical element has a body including a first, flat, end face and a second, curved end face, the second, curved end face being opposite to the first, flat end face, and plural optical fibers extending through the body, from the first, flat end face to the second, curved end face. End faces of the plural optical fibers, corresponding to the second, curved end face, are pointing in different directions.

BRIEF DESCRIPTION OF THE DRAWINGS

For a more complete understanding of the present invention, reference is now made to the following descriptions taken in conjunction with the accompanying drawings, in which:

FIG. 16 is a flow chart of a method for using optical wireless communication between two nodes with a non-flat fused fiber-optic taper.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to fused fiber-optic tapers that use tapered optical fibers. However, the embodiments to be discussed next are not limited to such a system, but may be applied to other compounded light focusing elements that use optical fibers or equivalent optical media.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a communication system that uses a non-flat fused fiber-optic taper (FFOTs), which includes a large number of tapered optical fibers fused together, into a single bundle, to form a compounded light-focusing element with a non-flat end face for OWC receivers. The FFOT is considered herein to be a specific implementation of the compounded light-focusing element. Each tapered optical fiber resembles an individual light-focusing element with a relatively narrow FOV. Combining the tapered optical fibers combines their fields of view, resulting in a wide compound FOV while maintaining a high optical gain. The compound light-focusing element of this embodiment also shows a high transmission efficiency for wavelengths in the visible and NIR band, as well as a fast response. The use of such a system minimizes the need for an active pointing-and-tracking system in OWC links, which in turn reduces the power consumption of the OWC link and the alignment processing requirements.

Figure 1:
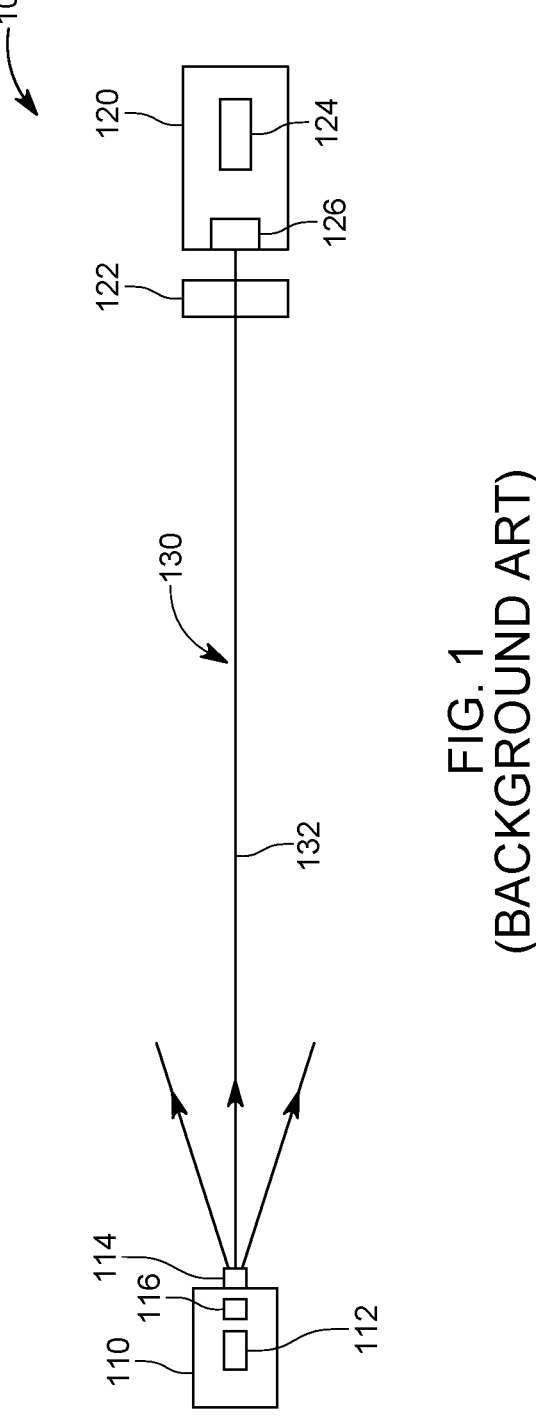
FIG. 1 is a schematic diagram of an optical wireless communication system.

Before discussing in more detail the new system, it is noted that the OWC systems in the U.S. Pat. No. 9,749,044 B1, entitled "Luminescent detector for free-space optical communication," and Patent Application Publication U.S. 2020/0177278 A1, entitled "Receiver assembly, data communications system, and data communications method," the entire contents of which are incorporated herein by reference, each relies on luminescent materials (located in the optics 122 in FIG. 1) to improve the FOV. However, using luminescent materials limits the modulation bandwidth due to their long radiative lifetime and limits the usable wavelengths due to the required high-photon excitation energy. This in turn limits the usability of these luminescent detectors to only those applications that can use short-wavelength light (e.g., below 500 nm). The luminescence-based detectors also suffer from instability, making them operable only for limited periods of time. Furthermore, their conversion efficiency is low, which lowers the overall gain.

The embodiments discussed herein, on the other hand, do not rely on luminescence materials or on the luminescence phenomena, which allows for higher communication speeds, higher optical gain, indefinite stability, and versatility in a wide variety of possible applications, ranging from the visible to the NIR light. More details of the novel embodiments are now discussed.

Figure 2A:
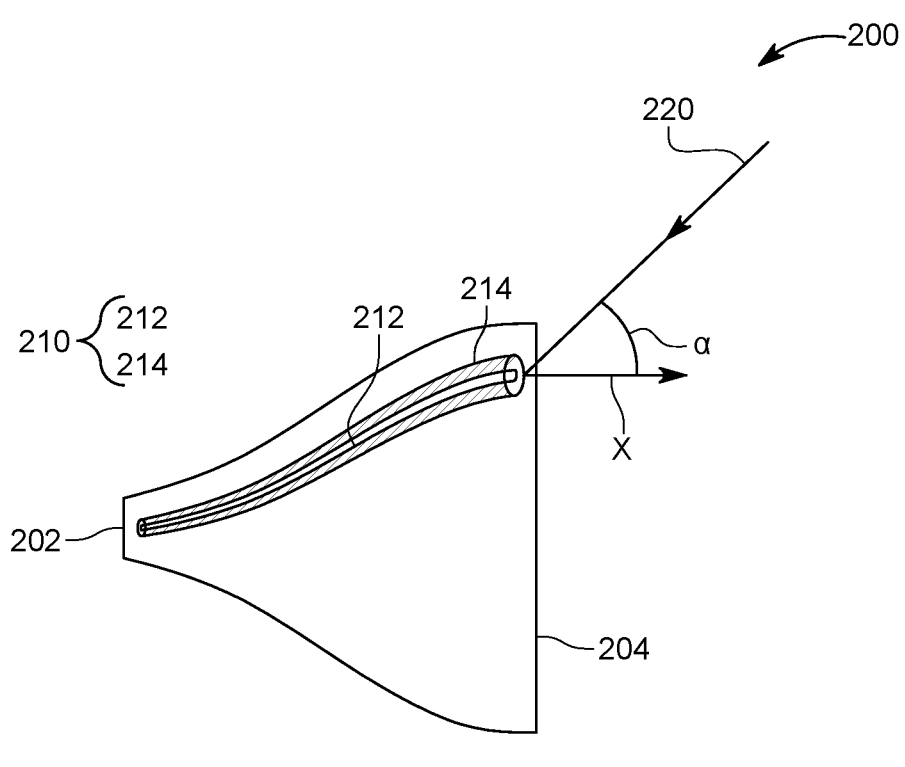
FIGS. 2A and 2B illustrate a flat fused fiber-optic taper used for focusing incoming optical beams to a narrower area.
Figure 2B:
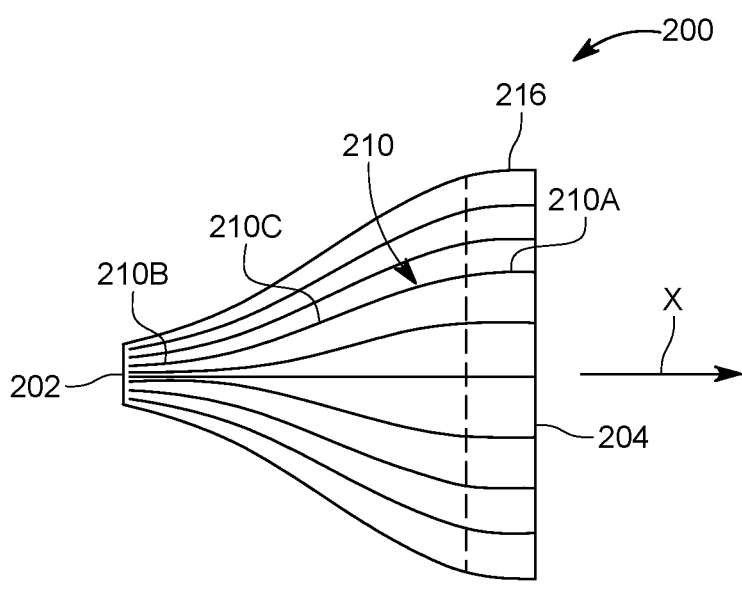

A side-view schematic of a typical flat FFOT 200 is shown in FIGS. 2A and 2B. The flat FFOT 200 is commonly used in medical imaging systems and as reading magnifiers. The flat FFOT includes a large number of tapered optical fibers (e.g., 100,000 tapered optical fibers) 210 (for simplicity, only one optical fiber is shown in FIG. 2A, but FIG. 2B shows plural optical fibers), all pointing in the same direction, and all fused together. The flat FFOT 200 is characterized by having both the narrow end face 202 and the large end face 204 flat. The process of tapering and fusing the optical fibers 210 may be done by techniques well known to someone skilled in the art. After this process, each fiber maintains its integrity, i.e., the core of each fiber is still separated from the core of a next fiber by the corresponding sheath, but with a reduced sheath thickness.

Each tapered optical fiber 210 includes a high-refractive-index core 212 and a low-refractive index cladding 214, that fully encapsulates the core 212. Further, as shown in FIG. 2B, there is a parallel fibers region 216, at the large flat end face 204, where all the optical fibers 210 are parallel to each other. In other words, the fore end 210A of each of the optical fibers is parallel to all other fore ends of the other optical fibers. The aft ends 210B of the optical fibers 210 may also be parallel to each other. However, the middle portions 210C of the optical fibers 210 are not parallel to each other.

The numerical aperture (NA) of an individual fiber 210, before tapering, can be calculated by:

$$NA = \sqrt{n_c^2 - n_{cl}^2}$$

Figure 3:
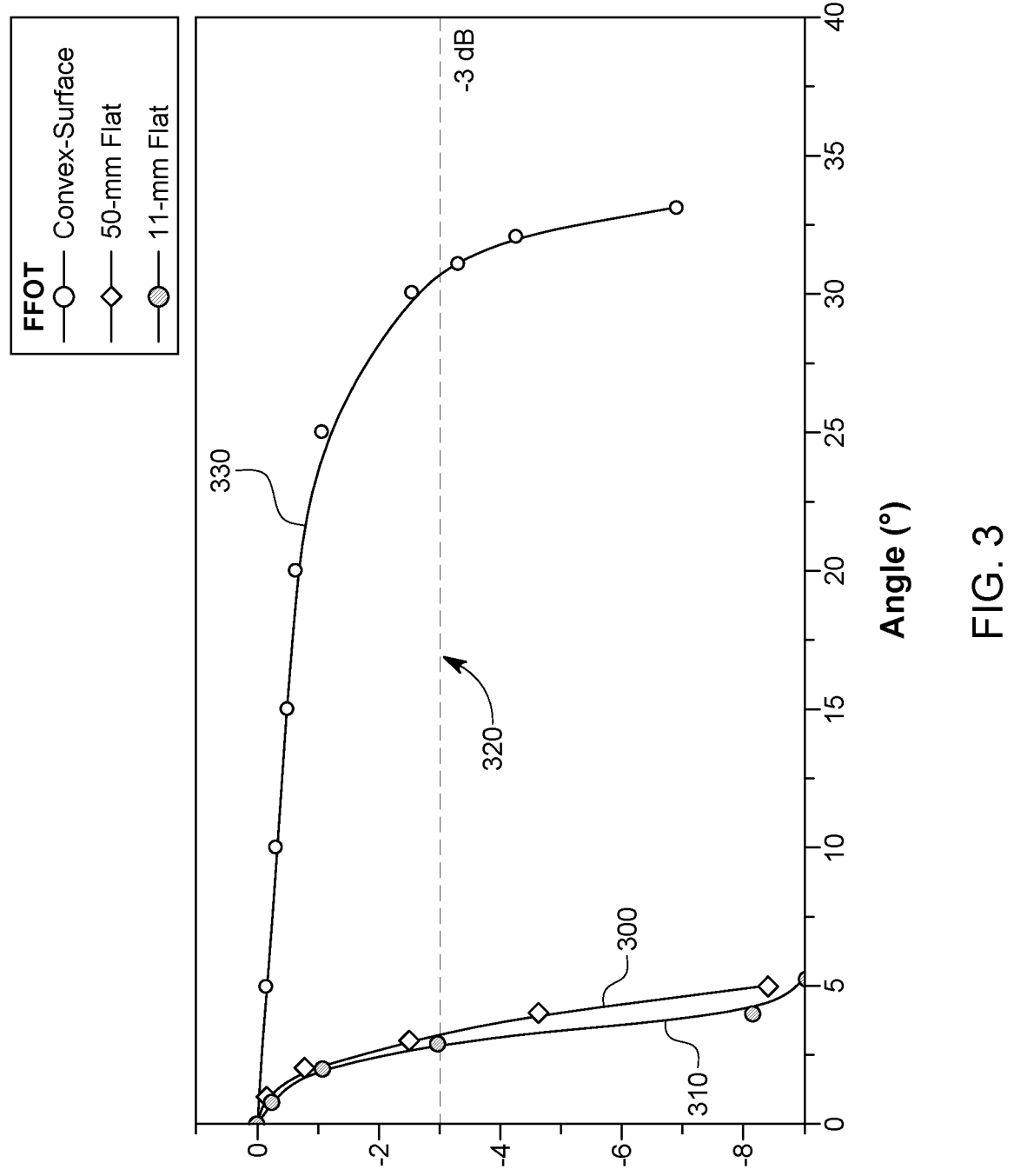
FIG. 3 illustrates the normalized received power for a flat fused fiber-optic taper and a non-flat fused fiber-optic taper.

, where $n_c$ and $n_{cl}$ are the refractive indices of the core and the cladding of the fiber, respectively. Note that in one embodiment, the core of the optical fibers has a diameter of about 80 µm and a refractive index of about 1.7 while the sheath of the optical fibers is about 10 µm thick and has a refractive index of about 1.5. Tapering the cross-sectional diameter of the fiber by a factor of R reduces its NA by the same factor. Since all fibers in the flat FFOT 200 are pointing in the same direction X, their compound FOV angle is not increased by combining them. This can be seen in FIG. 3 for the normalized received optical power (on the Y axis) for different angles of incidence, $\theta_i$ on the X axis. The angle of incidence is defined as the angle between an incoming beam 220 and the horizontal axis X, as shown in FIG. 2A. FIG. 3 shows a normalized received power curve 300 for a first flat FFOT 200 having a 50-mm-large-diameter end face and a normalized received power curve 310 for a second flat FFOT having an 11-mm-large-diameter end face. It is noted that both curves 300 and 310 indicate a maximum 5° FOV angle.

Figure 4A:
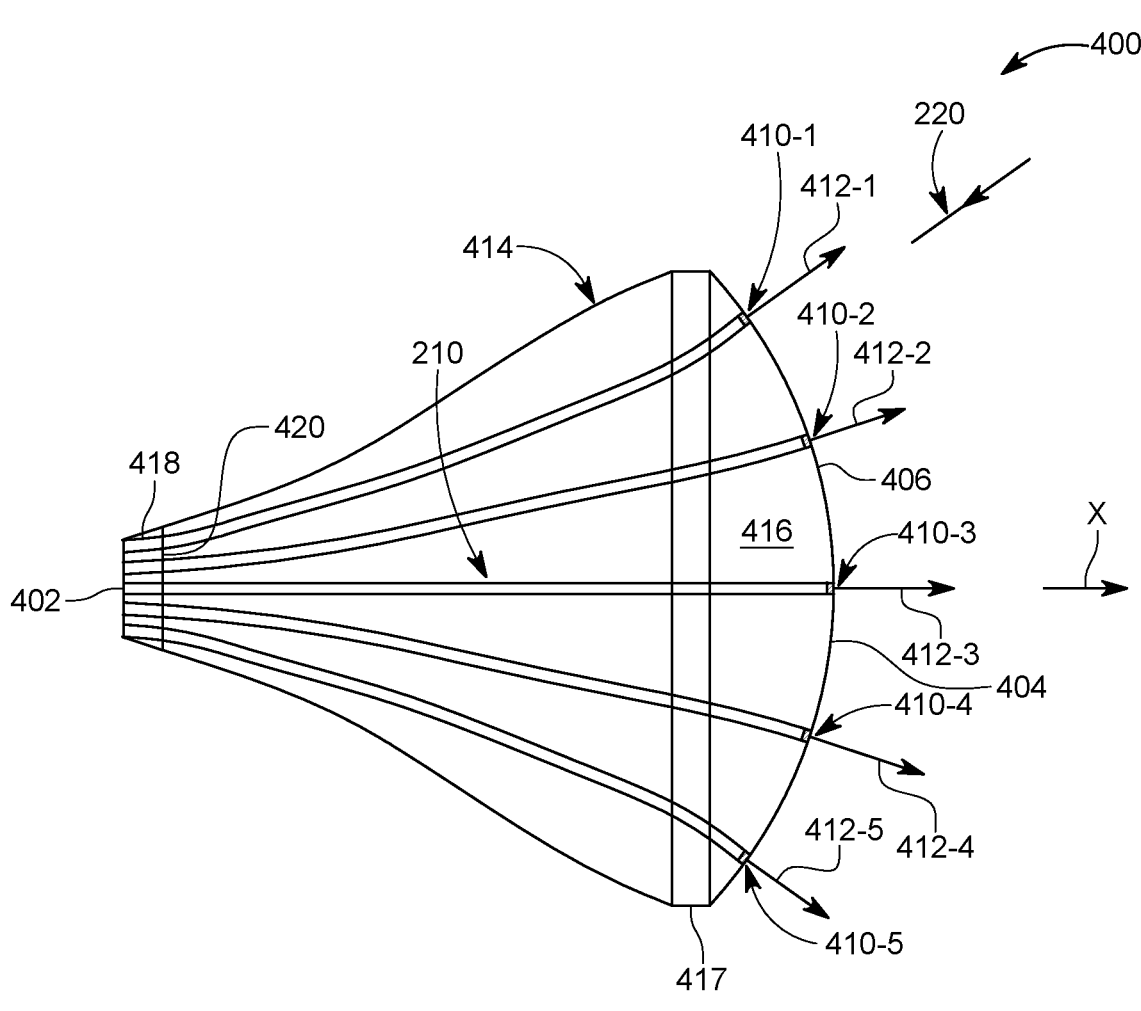
FIG. 4A illustrates a non-flat fused fiber-optic taper having one end face flat and the other end face non-flat.

To increase the FOV, the inventors have discovered that the large end face 204 of the flat FFOT 200 may be shaped (for example, carved) to form a convex surface 406, as shown in FIG. 4A, to obtain an enhanced non-flat FFOT 400. In the following, the term "flat FFOT" means that both end faces are flat, while the term "non-flat FFOT" means that at least the large end face is not flat. Thus, the large end face 404 is convex in this embodiment. The shaping/carving of the large end face 404 is performed so that the convex surface 406 extends only in the non-parallel fibers region 416. This specific selection of shaping the large end face 404 of the FFOT 400 ensures that individual fibers 210 are made to point in different directions. More specifically, FIG. 4A shows only five fibers (for simplicity), with each fiber having its end face 410-I (where I is a positive integer having a value in the thousands or hundreds of thousands, but the figure shows only five faces 410-1 to 410-5 for simplicity) pointing along different directions 412-I (the figure shows only five directions 412-1 to 412-5 for simplicity). While some subsets of the set of optical fibers 210 may point along a same direction, different subsets will point along different directions. In one embodiment, it is possible that each fiber points along a different direction. Note that the plurality of the end faces 410-I form the convex surface 406.

The plural fibers 210 that make up the non-flat FFOT 400 form the body 414, which has a bulb light like shape. The body 414 has one end (the narrow end) that terminates in the small end face 402, and the opposite end (the large end) that terminates in the large end face 404. The large end face 404 is characterized by the convex surface 406 (i.e., non-flat). The body 414 is divided into the non-parallel fibers region 416 and a parallel fibers region 418. An interface 420 between the non-parallel fibers region 416 and the parallel fibers region 418 is defined by a flat plane. Note that the optical fibers 210 in the non-parallel fibers region 416 are not parallel to each other, contrary to the parallel fibers region 418 where all the fibers are parallel to each other. In one embodiment, at least a portion of the non-parallel fibers region 416 define a cylindrical region 417, as also shown in FIG. 4A, and the convex surface 406 sits directly on top of the cylindrical region 417.

Figure 4B:
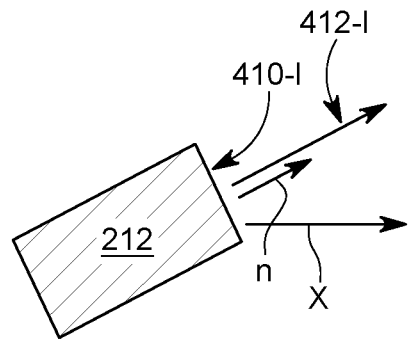
FIG. 4B illustrates a carved face of a single optical fiber of the non-flat fused fiber-optic taper.

Because the shaping/carving of the large end face 404 is made only in the non-parallel fibers region 416, before the point where all the fibers 210 start to converge toward the small end face 402, the end surfaces 410-1 to 410-5 of the cores 212 of the optical fibers 210 point along different directions 412-1 to 412-5, respectively. This means that the overall FOV of the convex-surface FFOT 400 is the combined fields of view of all tapered optical fibers it comprises. An end-surface 410-1 is considered to point along a corresponding direction 412-I when a normal n (i.e., a line that is perpendicular to the end-surface) to the end-surface 410-1 is aligned with the direction 412-I, as illustrated in FIG. 4B.

The horizontal line 320 in FIG. 3 shows the −3-dB level, which when taken as the definition of the FOV angle, shows that the convex-surface FFOT 400 has a FOV angle of ±30°, which corresponds to the normalized received power curve 330 obtained for the FFOT 400. Assuming circular symmetry for the convex surface 406 and for the distribution of the optical fibers 210 inside the non-flat FFOT 400, the FOV is estimated to be a cone defined by a half angle of 30°. Neighboring tapered optical fibers have fields of view that overlap with each other. Any incoming beam 220 is received and focused by a corresponding tapered optical fiber 210 whose field of view includes the incoming beam's angle of incidence.

Figure 5:
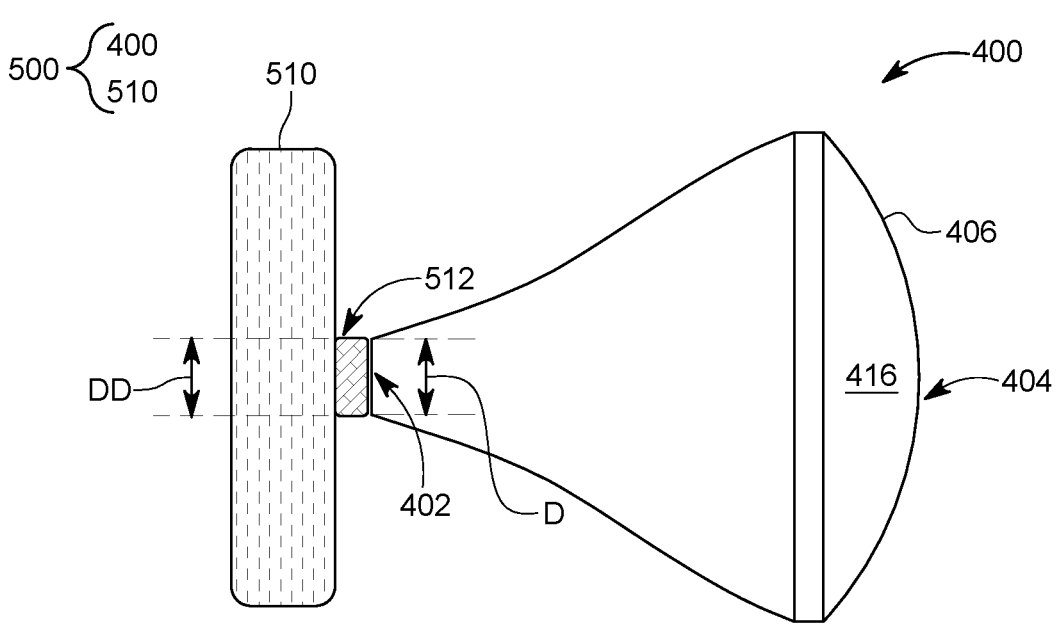
FIG. 5 illustrates the non-flat fused fiber-optic taper connected with its flat face to the sensitive area of a photodetector.
Figure 6:
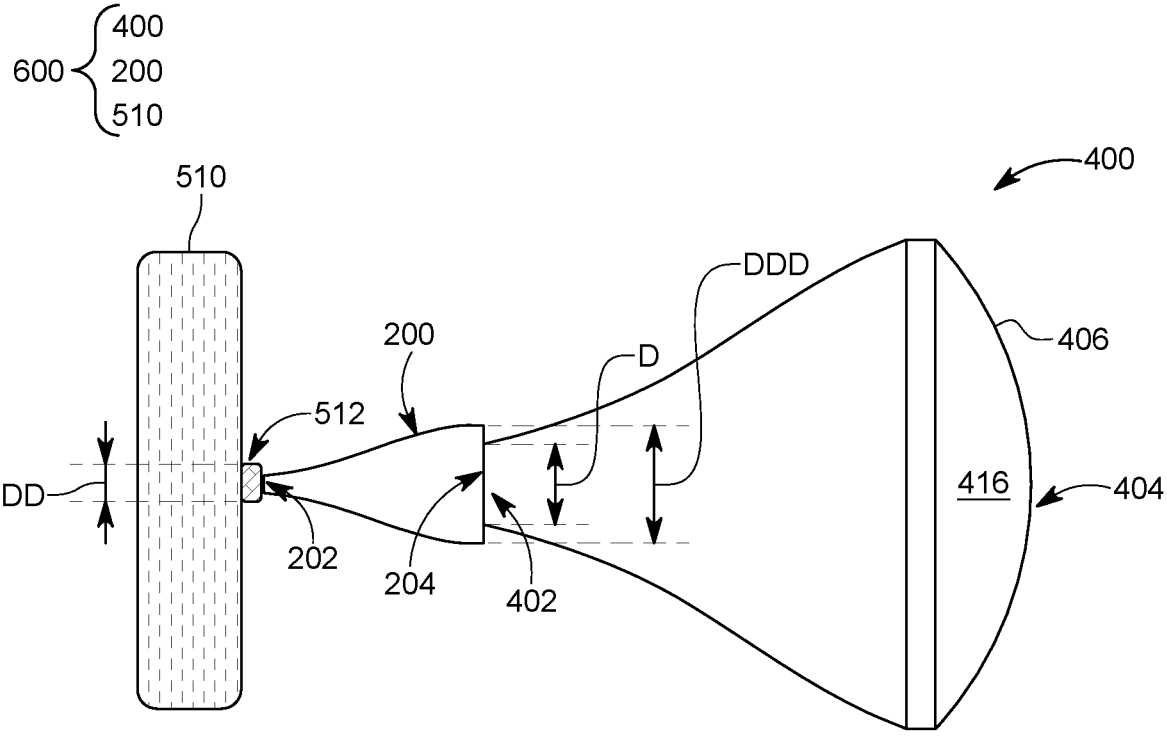
FIG. 6 illustrates a flat fused fiber-optic taper connected in series with a non-flat fused fiber-optic taper and this system is connected to the sensitive area of the photodetector.

In an embodiment, as shown in FIG. 5, the small-end face 402 of the convex-surface FFOT 400 is directly coupled to a single-pixel PD 510's active area 512 to form a wide-FOV light detection apparatus 500. Photons entering the large end face 404 of the convex-surface FFOT 400 are guided through the optical fibers 210 (not shown in the figure for simplicity) toward the single-pixel PD 510. In other embodiments, the single-pixel PD 510 can be replaced by an APD or a multi-pixel detector, among other options. When used with a multi-pixel detector, the use of FFOTs offers a significant advantage over conventional focusing elements (such as lenses or compound parabolic concentrators) since it allows for easily compounding a large number of focusing elements (tapered fibers). In one application, a diameter D of the small end face 402 of the convex-surface FFOT 400 is substantially equal to a diameter DD of the active area 512. Furthermore, in another embodiment, as illustrated in FIG. 6, the small end face 402 of the convex-surface FFOT 400 may be (directly and optically) coupled to the large end 204 of the flat FFOT 200 to increase the magnification ratio. The PD 510 may be a single-pixel PD or an APD. In one application, the active area 512 may be a multi-pixel area.

The optical gain provided by a light-focusing element can be expressed as:

$$G = \frac{P_{FFOT}}{P_{PD}},$$

where $P_{FFOT}$ is the optical power received by the single-pixel PD 510 coupled to the convex-surface FFOT 400 in FIG. 5 and $P_{PD}$ is the optical power received by the bare single-pixel PD 510. The optical gain depends on the ratio of the detection area of the convex-surface FFOT 400 to that of the single-pixel PD 510 as well as the optical transmission efficiency of the convex-surface FFOT 400.

The optical transmission efficiency depends on the design of the FFOT and the wavelength used. The FFOT's packing fraction is defined as the areas of the optical fiber's cores to the total area of the FFOT. As the packing fraction increases, the optical transmission efficiency increases. Decreasing the thickness of the cladding (or the sheath) of individual optical fibers 210 increases the packing fraction, but it may also increase the crosstalk between neighboring optical fibers. This crosstalk can degrade the quality of the imaging of the FFOT, but it has negligible effects on the communication performance. Thus, in an embodiment, the extra mural absorption (EMA), which is commonly used in imaging FFOTs, is not included in the design of the FFOTs used for OWC purposes. This increases the optical transmission efficiency. In the tested embodiments, the cores of the optical fibers 210 have diameters of 80 μm, whereas the sheaths are 10 μm thick.

Figure 7:
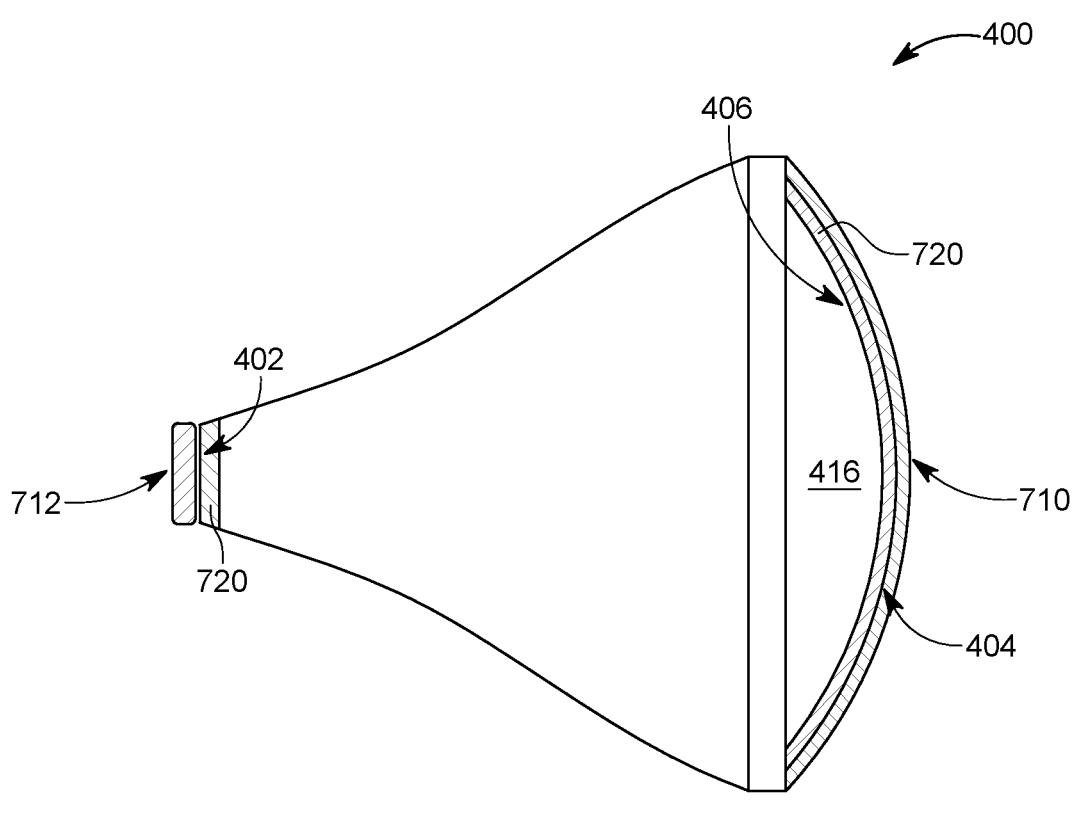
FIG. 7 illustrates the non-flat fused fiber-optic taper having one or both faces coated with an anti-reflection layer.

Furthermore, the optical transmission efficiency can be increased by applying an anti-reflection coating to reduce the light reflected from the input and output surfaces of the FFOT. At normal incidence, the reflection is given by:

$$R = \left(\frac{n_c - n_m}{n_c + n_m}\right)^2,$$

where $n_m$ is the refractive index of the surrounding medium. In the tested embodiment, $n_c=1.72$ and the surrounding medium is free space ($n_m=1$), making the reflection from the input surface around 7%. As the light exits the small end face 402, it experiences a 7% reflection again, assuming a small air gap between the FFOT 400 and the PD 510. In an embodiment, the convex surface 406 and/or the flat surface 402 of the convex-surface FFOT 400 are coated with anti-reflection coatings 710 and/or 712, respectively, as shown in FIG. 7. Additionally, one or both of the convex surface 406 and/or the flat surface 402 of the convex-surface FFOT 400 may be coated with a wavelength up/down-converting layer or phosphor 720 to convert the incident light into a higher/lower energy photon. The wavelength up/down-converting layer or phosphor 720 is selected to match the peak responsivity of the PD 510. In one application, the wavelength up/down-converting layer or phosphor 720 is formed directly on the surface 406 and the anti-reflection coating 710 is formed over the wavelength up/down-converting layer or phosphor 720. In another application, this order is reversed. The wavelength up/down-converting layer or phosphor 720 may be semiconductor quantum dots such as ZnS, InP, CdZnS, perovskite, etc. In one application, the wavelength up/down-converting layer or phosphor 720 is applied on the small size face 402 and the anti-reflection coating layer 710 is formed on the large size face 404.

Figure 8:
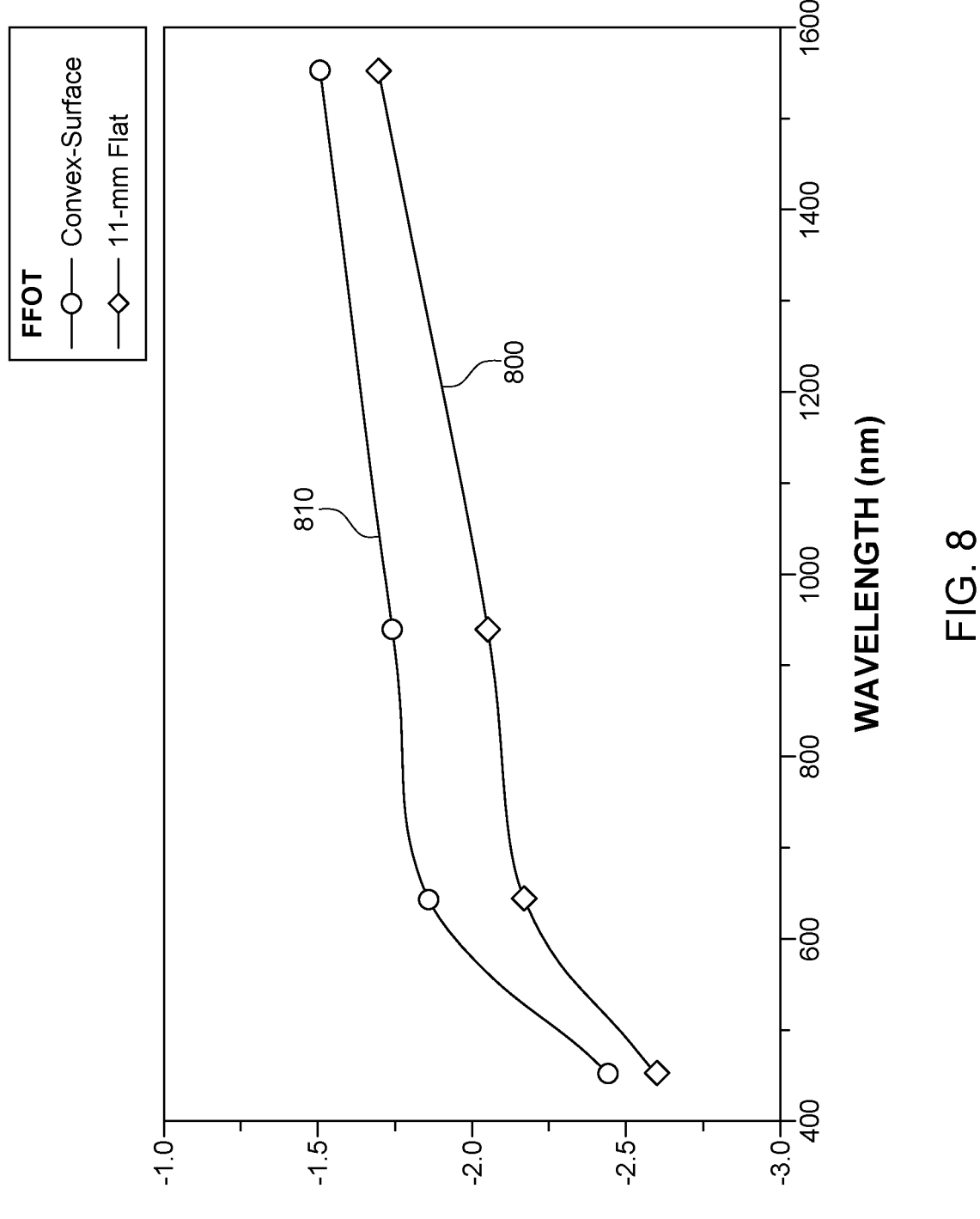
FIG. 8 shows the transmission efficiency of the non-flat fused fiber-optic taper versus the flat fused fiber-optic taper as a function of the incoming beam's wavelength.

The optical transmission efficiency also depends on the received wavelength. In tested embodiments, the wavelengths ranging from 450 nm to 1550 nm were transmitted through two different FFOTs (11-mm-large-diameter flat FFOT and a 46-mm-large-diameter convex-surface FFOT) with transmission efficiencies between 55% and 70.7%, as shown in FIG. 8. Curve 800 corresponds to the transmission efficiency of the 11-mm-large-diameter flat FFOT while curve 810 corresponds to the transmission efficiency of the 46-mm-large-diameter convex-surface FFOT. Based on the results obtained in FIG. 8, these FFOTs are suitable for applications relying on visible and NIR light, such as underwater OWC and FSO communication, respectively.

The high transmission efficiency also allows for a high optical gain from the FFOTs. In an embodiment, in which the two FFOTs 200 and 400 are cascaded as illustrated in FIG. 6, the small end 202 of the flat FFOT 200 is (directly and optically) coupled to the APD 510's active area 512, and the flat small end face 402 of the non-flat FFOT 400 is optically coupled (directly) to the flat large face 204 of the flat FFOT 200. For this configuration, an optical gain, at an incidence angle of 0°, of 121.3 was measured. In one application, the DD diameter of the active area 512 is substantially equal to the diameter of the end face 202 of the flat FFOT 200 while the diameter DDD of the flat large face 204 is substantially the same as the diameter D of the flat small face 402 of the FFOT 400. In one application, the diameter DDD is about 0.5 mm. Cascading the two FFOTs 200 and 400 increases the magnification of the system. The same result may be obtained by increasing the tapering ratio of the convex-surface FFOT 400 instead, i.e., by making the diameter of its flat small face 402 approximately equal to that of the APD's 510's active area 512. Applying the anti-reflection coatings 710 and/or 712 and increasing the packing fraction can also improve the optical transmission efficiency.

Figure 9:
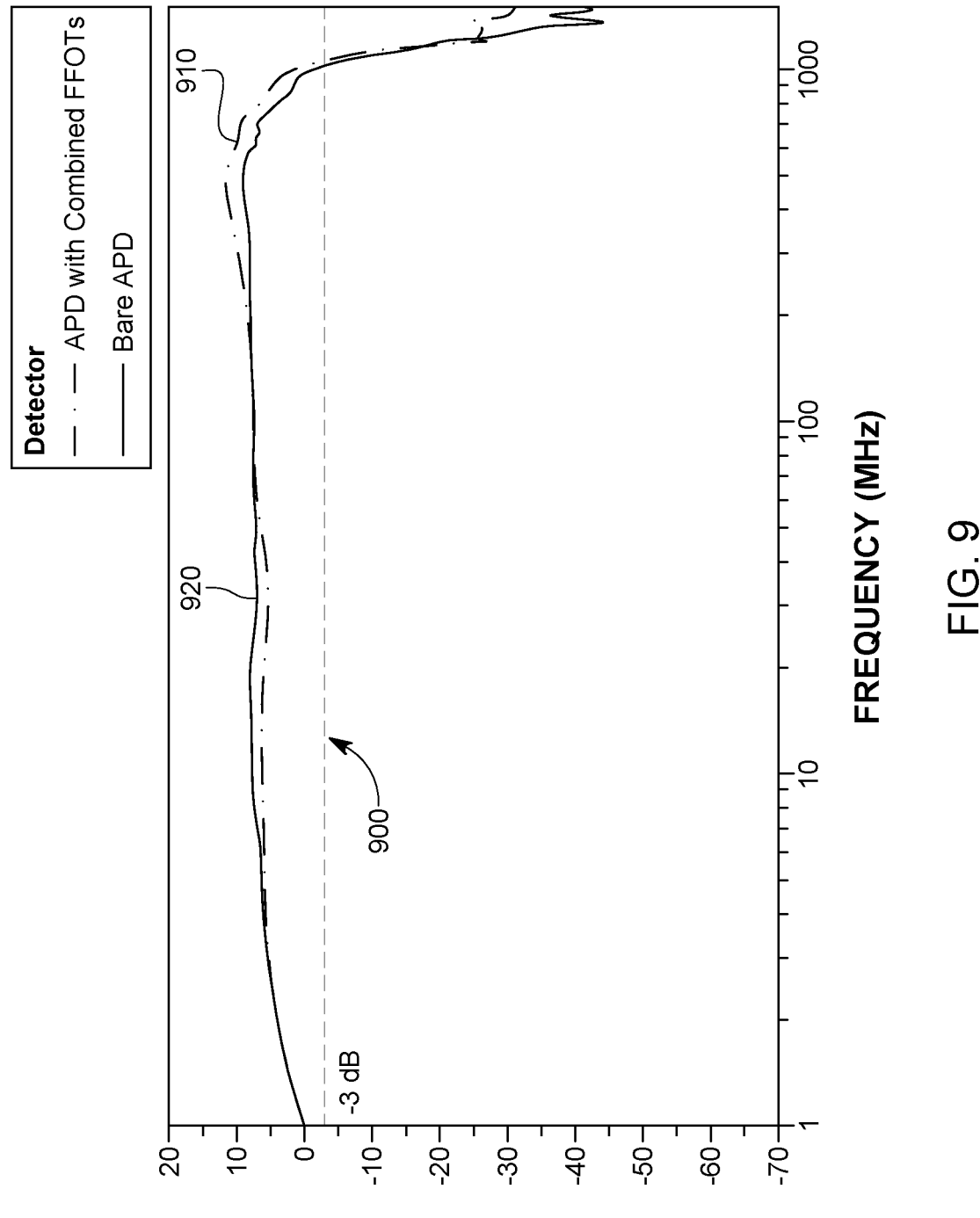
FIG. 9 shows the normalized response of a photodector when combined with a non-flat fused fiber-optic taper and with no taper, as a function of the frequency.

Because the FFOTs used in the above embodiments rely on refraction and reflection, they have negligible effects on the modulation bandwidth of the optical link between the transmitter and receiver. As shown in FIG. 9, the effect on the frequency response of placing the two FFOTs 200 and 400 in front of the APD 510 (as illustrated in FIG. 6) is negligible. The −3-dB modulation bandwidth (defined as the frequency at which the response crosses the −3-dB line 900) is measured to be approximately 1 GHz when the non-flat FFOT 400 is used (see curve 910), which is only limited by the used APD. The response of a bare APD is illustrated by curve 920.

Figure 10:
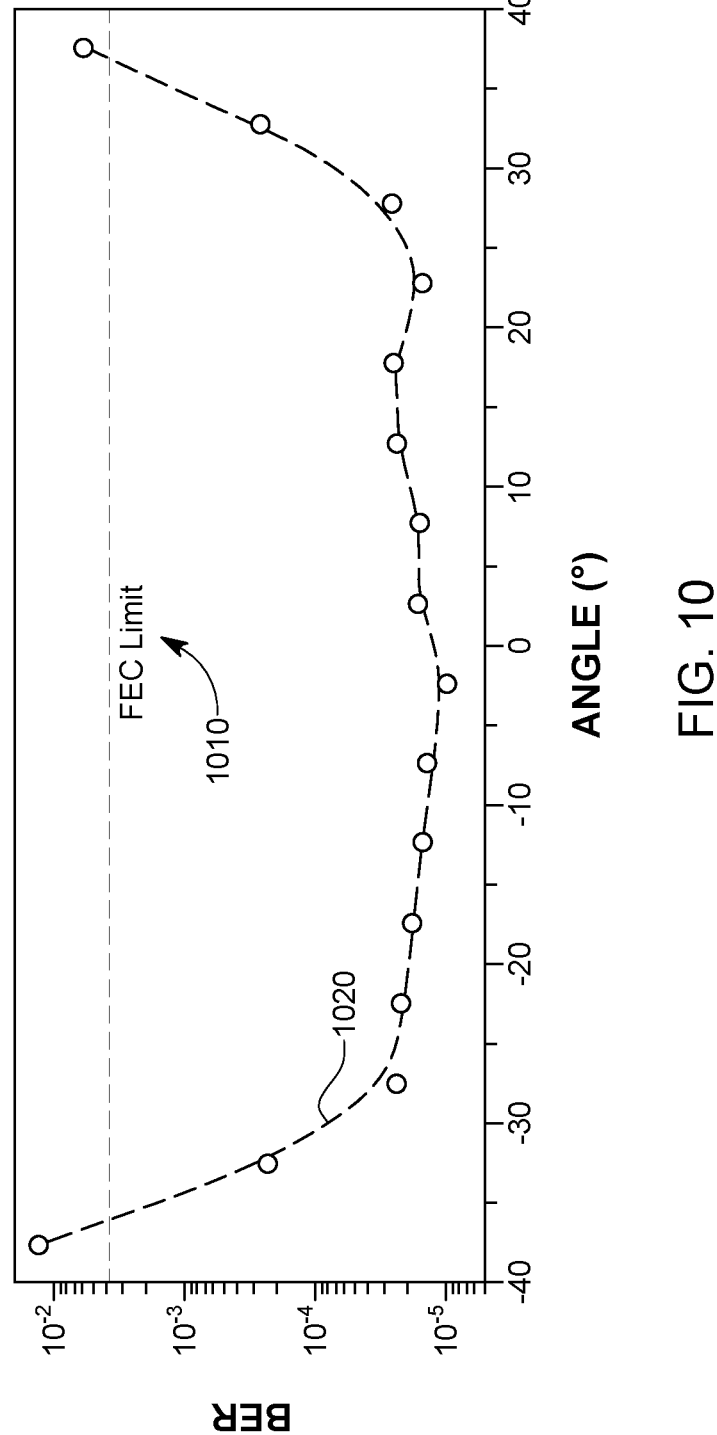
FIG. 10 shows the bit error ratio of a received modulated signal at different angles of incidence when using the non-flat fused fiber-optic taper.

To verify the communication performance of the convex-surface FFOT-based system discussed herein, for example, the one shown in FIG. 6, the inventors have tested the reception of a 1-Gbit/s signal modulating the light intensity emitted from a 642-nm LD by measuring the bit error ratio (BER) of the received signal at different angles of incidence, as shown in FIG. 10. The horizontal line 1010 shows the 7% overhead forward error correction (FEC) $3.8\times10^{-3}$ BER limit, which is a well-known limit used in the art. The signal 1020 is received with acceptable BER values for angles of incidence in the range ±30°. Higher communication speeds are possible by implementing spectrally efficient modulation schemes.

Figure 11:
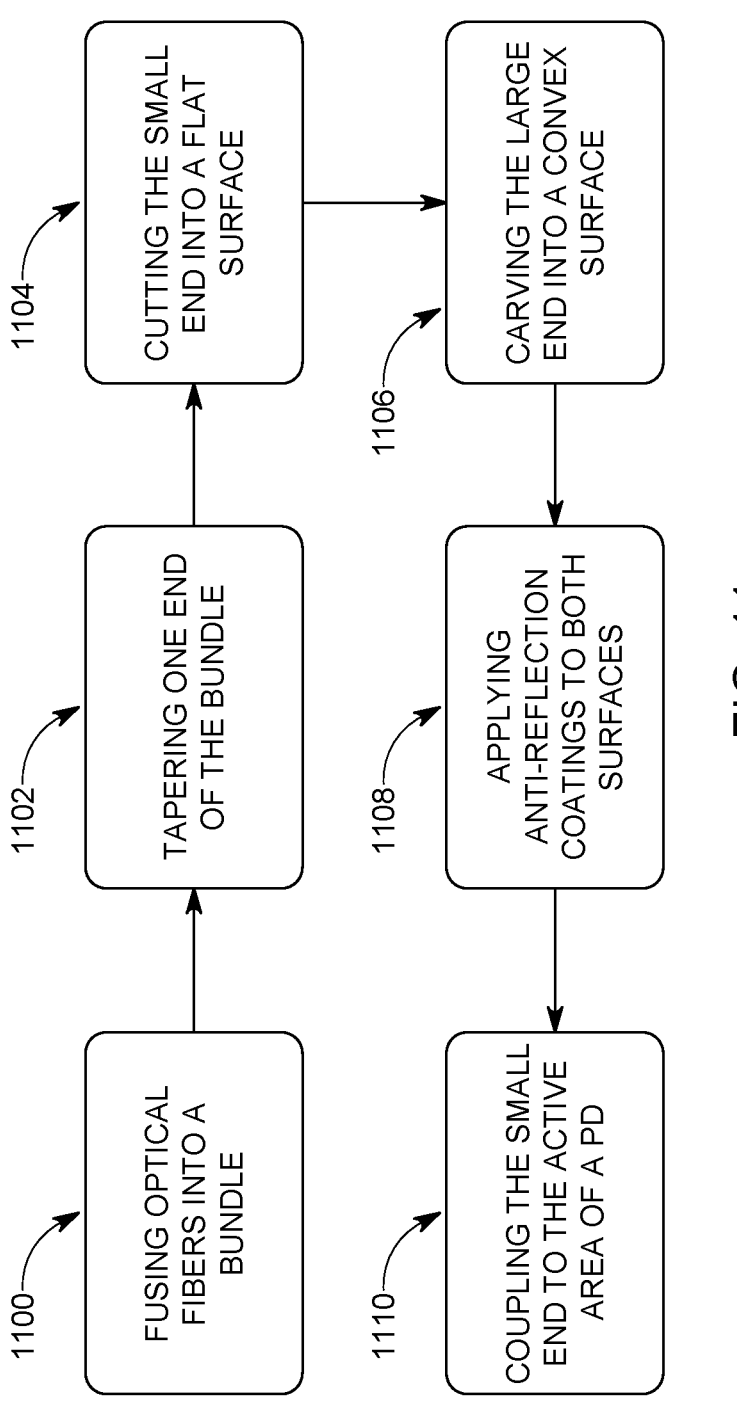
FIG. 11 is a flow chart of a method for manufacturing the non-flat fused fiber-optic taper.

The convex-surface FFOT 400 may be manufactured as now discussed with regard to FIG. 11. In step 1100, plural, individual optical fibers 210 are fused together into a bundle. Thermal procedures may be used for this step. In step 1102, one end of the bundle is tapered. During this step, the cladding part of some or all of the optical fibers may, at the aft end, be reduced in diameter. In step 1104, the small end face of the bundle is cut to obtain the flat surface 402. In step 1106, the large end face of the bundle is carved to obtain the convex surface 406 of the large end face 404. In step 1108, one or more anti-reflection coatings may be applied to one or both end faces. In step 1110, the small end face 402 is coupled to the active area 512 of the PD 510 to form the wide-FOV light detection apparatus 500.

Figure 12:
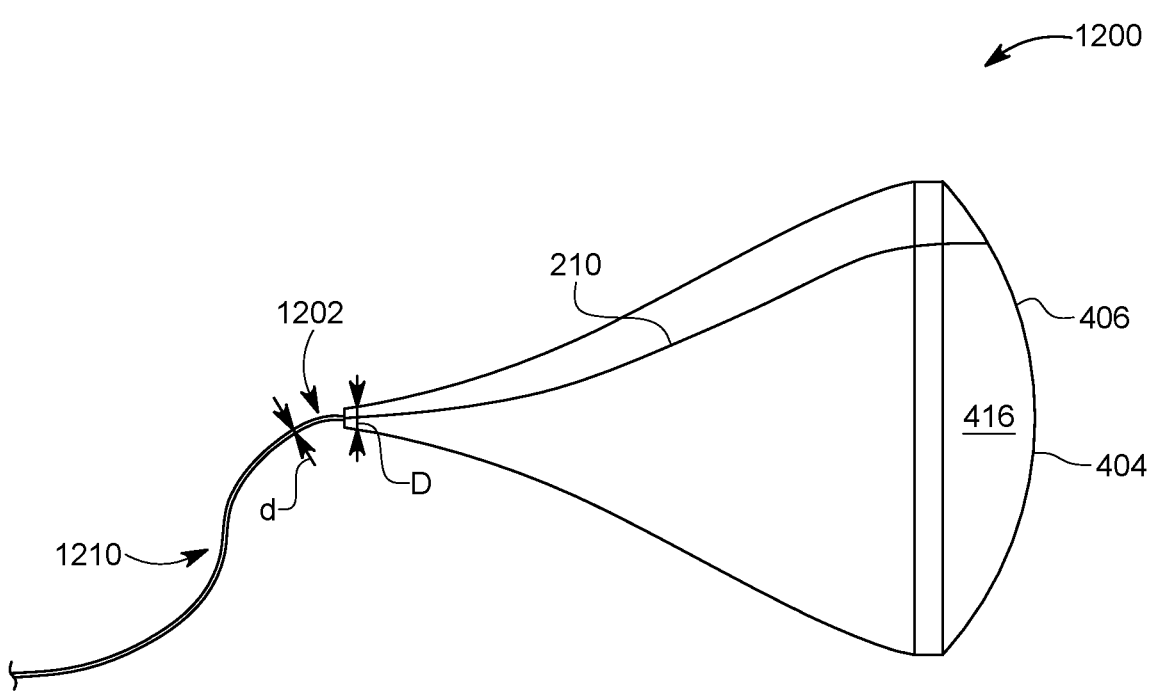
FIG. 12 shows another non-flat fused fiber-optic taper having the small end face sized to match one or more external optical fibers.

In another embodiment, the output end face 1202 of a convex-surface FFOT 1200, see FIG. 12, may be tapered down to the scale of the optical fibers 1210 used in optical fiber networks. In other words, the diameter D of the small end face 1202 is substantially equal to a diameter d of one or more optical fibers 1210 to which the convex-surface FFOT 1200 is directly connected. In this embodiment, the term "substantially" is understood to mean +/−10%. Using the convex-surface FFOT 1200 of this embodiment, the integration of OWC networks and optical fiber networks is made possible by fusing the small-end output face 1202 of the convex-surface FFOT 1200 directly to the optical fiber cable 1210.

Figure 13:
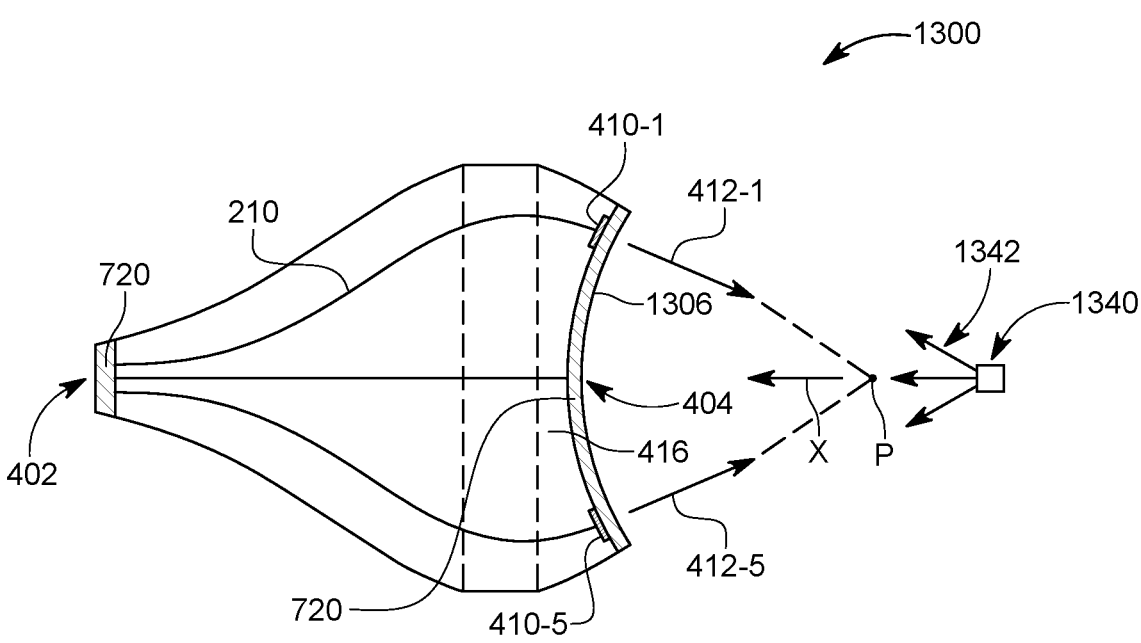
FIG. 13 shows a non-flat fused fiber-optic taper in which the non-flat end face is concave.
Figure 14:
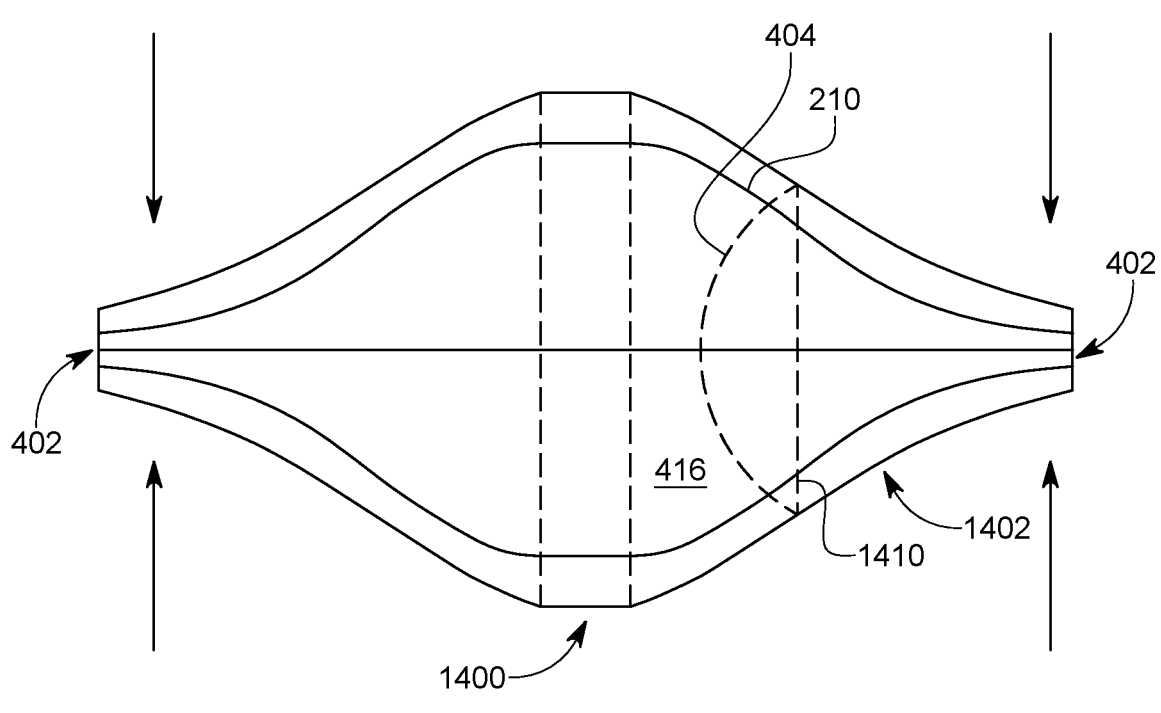
FIG. 14 illustrates how the concave fused fiber-optic taper is manufactured.

In yet another embodiment, the FOV of the FFOT 400/ 1200 may be configured to serve other purposes than helping in the alignment of two nodes, of which at least one is a moving node. As an example, and not by way of limitation, a FFOT 1300's input surface 1306 can be made concave, with the optical fiber ends 410-1 and 410-5 (only two such ends are shown in the figure, but one skilled in the art would understand that there may be hundreds of thousands of such ends) of the tapered optical fibers 210 pointing inward, as shown by the corresponding arrows 412-1 and 412-5 in FIG. 13. Thus, the large end face 404 is now concave instead of being convex as in the embodiment shown in FIG. 4A. This configuration may be advantageous when a transmitter/ source 1340 is fixed and emits a divergent beam of light rays 1342 or the light scatters or the beam direction might change randomly because of the channel, and the receiver that uses the non-flat FFOT 1300 needs to concentrate/focus the divergent light rays onto its PD 510 to increase the overall sensitivity of the system. The concave-surface FFOT 1300 can be obtained, for example, by tapering the fused fibers 210 at two opposite end faces 402, as shown in FIG. 14, cutting off, at a plane 1410, one portion 1402 of the entire bundle 1400, and then carving the concave large surface 1306, to obtain the FFOT 1300. The resulting concave-surface FFOT 1300 may be used in OWC links between two fixed nodes in which misalignments and beam wander may occur as a result of the conditions of the channel and not because the nodes are moving relative to each other. In this case, the beam 1342 in FIG. 13 arrives at the concave surface 1306 at different angles with respect to the intended propagation axis X. Since the fibers 210 are pointing inward toward the propagation axis X, they can guide the incoming light rays 1342 that are incident at angles tilted from the propagation axis. One or both of the faces 402 and 404 may be coated with the wavelength up/down-converting layer or phosphor 720, as discussed in FIG. 7, to match the peak responsivity of the PD. Another application of the concave FFOT 1300 is related to improving the collection efficiency from color-converting materials used in optical communication. Color conversion has been demonstrated and used previously, but the collection efficiency has always been low because the light from the fluorescent material is emitted spontaneously in all directions. The concave configuration shown in FIG. 13 addresses this issue when the color-converting material 720 is placed at the intersection point P of the directions of all fibers since photons emitted at a specific angle will land normally on the corresponding fiber.

Figure 15:
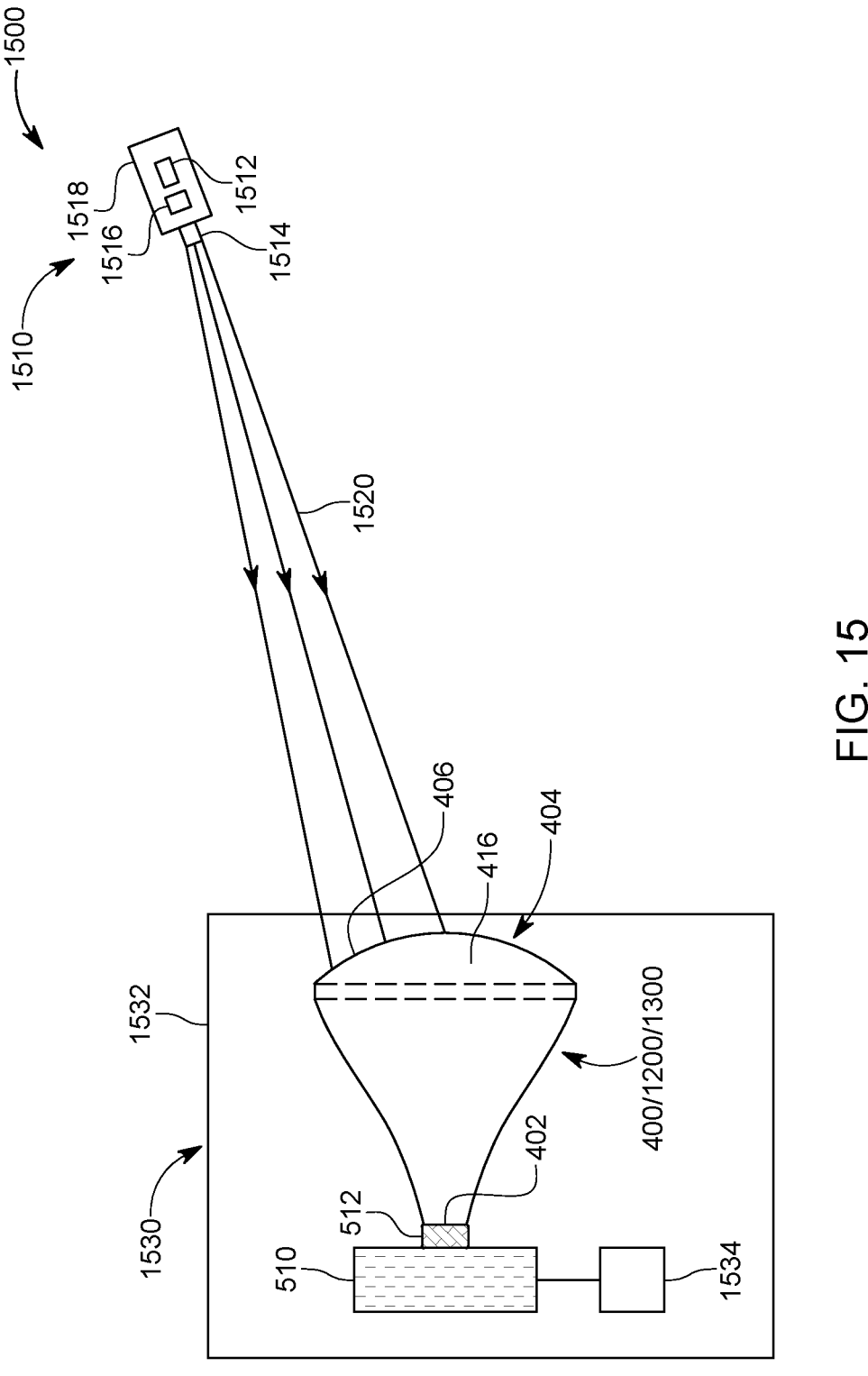
FIG. 15 illustrates an optical wireless communication system that uses the non-flat fused fiber-optic taper at a receiver node.

The curved-surface FFOT 400/1200/1300 may be used in a corresponding OWC communication system 1500, as illustrated in FIG. 15. A transmitter node 1510 may include electronic components 1512, optical components 1514 and at least one light source 1516, placed in or on a housing 1518. The light source 1516's intensity is modulated by the electronic components 1512, by varying the injected current or by an external modulator. Thus, the generated light rays 1520 can carry information, which is encoded in the modulated light intensity. The light rays 1520 may be selected to be in IR, visible and/or UV range. The receiver node 1530 has a housing 1532 that houses any of the non-flat FFOTs 400/1200/1300, electronic components 1534, and at least one light-sensitive element, e.g., PD 510, which records the variations in the light intensity of the incoming light 1520. The signal carried by the incoming light 1520 is then decoded from the intensity variations (detected by the light sensitive element) by the electronics 1534. The electronics in each of the receiver and transmitter nodes may include a processor for processing the signals and a memory for storing instructions regarding the processing. The receiver and transmitter nodes may be any of: a mobile phone, base station in a communication system, a computer, a portable processing device, a satellite, a wi-fi enabled device or router, etc. Note that any and each of the previously discussed embodiments may be used in the system 1500, i.e., the non-flat FFOT may be alone or coupled with a flat FFOT as shown in FIG. 6, or one or more faces of the FFOT may be coated with the layers shown in FIG. 7, or the non-flat surface of the large end face may be convex as in FIG. 4A or concave as in FIG. 13, etc. In other words, any combination of the embodiments shown in the various figures is expected and possible.

A method for optical wireless communication between the two nodes 1510 and 1530 of the system shown in FIG. 15 is now discussed with regard to FIG. 16. The method includes a step 1600 of generating, at the transmitter node, an optical beam, a step 1602 of encoding information into the optical beam, a step 1604 of transmitting the encoded information with the optical beam, a step 1606 of receiving, at a non-flat compounded light-focusing optical element of a receiver node, the optical beam, a step 1608 of focusing the optical beam, with non-flat compounded light-focusing optical element, to a photodetector, and a step of extracting the encoded information from the optical beam. The non-flat compounded light-focusing optical element has a body including a first, flat, end face and a second, curved end face, the second, curved end face being opposite to the first, flat end face, and plural optical fibers extending through the body, from the first, flat end face to the second, curved end face. End faces of the plural optical fibers, corresponding to the second, curved end face, are pointing in different directions. In one application, the second, curved end face is convex.

The disclosed embodiments provide a curved-surface fused fiber-optics taper that focuses incoming divergent lights to a small sensitive area. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.
[1] U.S. Pat. No. 9,749,044 B1;
[2] U.S. Patent Application Publication No. 2020/0177278 A1.

What is claimed is:

1. A compounded light-focusing optical element configured to focus light, the compounded light-focusing optical element comprising:
   a body having a first, flat end face, a parallel fibers region, a cylindrical region, and a second, curved end face, the second, curved end face being opposite to the first, flat end face, and the parallel fibers region and the cylindrical region being located between the first, flat end face and the second, curved end face; and
   plural optical fibers extending through the body, from the first, flat end face to the second, curved end face,
   wherein the plural optical fibers are tapered toward the first, flat end face and fused to each other to form the body, wherein each fiber comprises a core and a cladding,
   wherein end faces of the plural optical fibers, corresponding to the second, curved end face, are pointing in different directions,
   wherein the plural optical fibers are parallel to each other within the parallel fibers region,
   wherein each of the parallel fibers region and the cylindrical region extends along a longitudinal axis of the body, and
   wherein the cylindrical region has a constant cross-sectional diameter along the longitudinal axis.

2. The compounded light-focusing optical element of claim 1, wherein the second, curved end face is convex.

3. The compounded light-focusing optical element of claim 1, wherein the second, curved end face is concave.

4. The compounded light-focusing optical element of claim 1, wherein the body includes a non-parallel optical fibers region where not all the plural optical fibers are parallel to each other.

5. The compounded light-focusing optical element of claim 1, further comprising:
   a wavelength up/down-converting layer or phosphor, for changing a wavelength of an incoming light to a different wavelength, and located over at least one of the first, flat end face and the second, curved end face of the body.

6. The compounded light-focusing optical element of claim 1, wherein the first, flat end face is sized to have a diameter substantially equal to a bundle of optical fibers, which are optically coupled to the first, flat end face.

7. An optical wireless communication system comprising:
   a transmitter node configured to generate an optical beam having encoded information; and
   a receiver node configured to receive the optical beam and to extract the encoded information,
   wherein the receiver node includes a non-flat compounded light-focusing optical element configured to focus the optical beam, the non-flat compounded light-focusing optical element including,
   a body having a first, flat end face, a parallel fibers region, a cylindrical region, and a second, curved end face, the second, curved end face being opposite to the first, flat end face, and the parallel fibers region and the cylindrical region being located between the first, flat end face and the second, curved end face; and
   plural optical fibers extending through the body, from the first, flat end face to the second, curved end face,
   wherein the plural optical fibers are tapered toward the first, flat end face and fused to each other to form the body, wherein each fiber comprises a core and a cladding,
   wherein end faces of the plural optical fibers, corresponding to the second, curved end face, are pointing in different directions,
   wherein the plural optical fibers are parallel to each other within the parallel fibers region,
   wherein each of the parallel fibers region and the cylindrical region extends along a longitudinal axis of the body, and
   wherein the cylindrical region has a constant cross-sectional diameter along the longitudinal axis.

8. The system of claim 7, wherein the second, curved end face is convex.

9. The system of claim 7, wherein the second, curved end face is concave.

10. The system of claim 7, wherein the body includes a non-parallel optical fibers region where not all the plural optical fibers are parallel to each other.

11. The system of claim 7, further comprising:
   a wavelength up/down-converting layer or phosphor, for changing a wavelength of an incoming light to a different wavelength, and located over at least one of the first, flat end face and the second, curved end face of the body.

12. The system of claim 7, wherein the first, flat end face is sized to have a diameter substantially equal to a bundle of optical fibers, which are optically coupled to the first, flat end face.

13. The system of claim 7, wherein the receive node comprises:

a photodetector having an active area, the active area being configured to receive the optical beam and transform the optical beam into an electric current; and electronics configured to process the electric current and extract the encoded information.

14. The system of claim 13, further comprising:

a flat compounded light-focusing optical element connected in series with the non-flat compounded light-focusing optical element, wherein the flat compounded light-focusing optical element has both end faces flat.

15. The system of claim 14, wherein a first flat face of the flat compounded light-focusing optical element is optically coupled to the active area, and a second flat face of the flat compounded light-focusing optical element is optically coupled to the first, flat end face of the non-flat compounded light-focusing optical element.

16. The system of claim 7, wherein each of the transmitter node and the receiver node uses visible light or infrared light or ultraviolet light.

17. A method for optical wireless communication, the method comprising:

generating, at a transmitter node, an optical beam;

encoding information into the optical beam;

transmitting in a wireless manner the encoded information with the optical beam;

receiving, at a non-flat compounded light-focusing optical element of a receiver node, the optical beam;

focusing the optical beam, with the non-flat compounded light-focusing optical element, to a photodetector; and extracting the encoded information from the optical beam, wherein the non-flat compounded light-focusing optical element has a body including a first, flat end face, a parallel fibers region, a cylindrical region, and a second, curved end face, the second, curved end face being opposite to the first, flat end face, the parallel fibers region and the cylindrical region being located between the first, flat end face and the second, curved end face, and plural optical fibers extending through the body, from the first, flat end face to the second, curved end face, the plural optical fibers being tapered toward the first, flat end face and fused to each other to form the body, wherein each fiber comprises a core and a cladding, wherein end faces of the plural optical fibers, corresponding to the second, curved end face, are pointing in different directions, wherein the body includes a parallel fibers region in which the plural optical fibers are parallel to each other, wherein each of the parallel fibers region and the cylindrical region extends along a longitudinal axis of the body, wherein the cylindrical region has a constant cross-sectional diameter along the longitudinal axis.

18. The method of claim 17, wherein the second, curved end face is convex.

* * * * *